United States Patent
Ozeki et al.

(10) Patent No.: US 11,028,013 B2
(45) Date of Patent: Jun. 8, 2021

(54) CHEMICALLY STRENGTHENED GLASS AND METHOD FOR PRODUCING THE SAME

(71) Applicant: AGC Inc., Chiyoda-ku (JP)

(72) Inventors: Masao Ozeki, Tokyo (JP); Shusaku Akiba, Tokyo (JP); Izuru Kashima, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 721 days.

(21) Appl. No.: 15/896,639

(22) Filed: Feb. 14, 2018

(65) Prior Publication Data

US 2018/0230044 A1    Aug. 16, 2018

(30) Foreign Application Priority Data

Feb. 15, 2017 (JP) .............................. JP2017-026227

(51) Int. Cl.
  *C03C 21/00*  (2006.01)
  *C03C 3/085*  (2006.01)

(52) U.S. Cl.
  CPC ............ *C03C 21/002* (2013.01); *C03C 3/085* (2013.01)

(58) Field of Classification Search
  CPC .................................................. C03C 21/002
  USPC .................................................. 428/410, 426
  See application file for complete search history.

(56) References Cited

U.S. PATENT DOCUMENTS

| 3,853,674 | A | * | 12/1974 | Levene | ................... | C03C 21/00 |
| | | | | | | 428/410 |
| 2010/0009154 | A1 | * | 1/2010 | Allan | ....................... | C03C 3/085 |
| | | | | | | 428/220 |
| 2012/0194974 | A1 | * | 8/2012 | Weber | ................... | C03C 21/002 |
| | | | | | | 361/679.01 |
| 2013/0219966 | A1 | * | 8/2013 | Hasegawa | ............. | C03C 21/002 |
| | | | | | | 65/30.14 |
| 2013/0224492 | A1 | * | 8/2013 | Bookbinder | .......... | C03C 21/002 |
| | | | | | | 428/410 |
| 2014/0234607 | A1 | * | 8/2014 | Matsuda | ................. | C03C 21/00 |
| | | | | | | 428/220 |
| 2014/0345325 | A1 | * | 11/2014 | Allan | .................... | C03C 21/002 |
| | | | | | | 65/30.14 |

(Continued)

FOREIGN PATENT DOCUMENTS

| JP | 2011-527661 A | 11/2011 |
| JP | 2013-518800 A | 5/2013 |

(Continued)

*Primary Examiner* — Lauren R Colgan
(74) *Attorney, Agent, or Firm* — Oblon, McClelland, Maier & Neustadt, L.L.P.

(57) ABSTRACT

A chemically strengthened glass has a compressive stress layer formed in a glass surface layer by ion exchange. The compressive stress layer includes at least two types of stress patterns of a stress pattern A close to a glass surface and a stress pattern B on an inner side of the glass. In the stress pattern A, compressive stress increases as going inward from the glass surface. In the stress pattern B, compressive stress decreases as going inward from the glass surface. Depth of compressive stress layer in the stress pattern B is 90 μm or more from the glass surface. Compressive stress α MPa of the glass surface in the stress pattern A and compressive stress β MPa at a point where the stress pattern A and the stress pattern B cross each other satisfy a relation of $\beta > \alpha$.

10 Claims, 3 Drawing Sheets

(56) References Cited

U.S. PATENT DOCUMENTS

| | | | | |
|---|---|---|---|---|
| 2015/0030834 A1* | 1/2015 | Morey | ................... | G01N 3/30 |
| | | | | 428/220 |
| 2015/0079398 A1* | 3/2015 | Amin | ................... | C03C 17/22 |
| | | | | 428/408 |
| 2015/0147574 A1* | 5/2015 | Allan | ................... | C03C 3/083 |
| | | | | 428/410 |
| 2015/0210588 A1* | 7/2015 | Chang | ................... | C03C 15/00 |
| | | | | 361/750 |
| 2015/0239775 A1* | 8/2015 | Amin | ................... | C03C 3/091 |
| | | | | 428/220 |
| 2016/0023944 A1 | 1/2016 | Bookbinder et al. | | |
| 2016/0102014 A1* | 4/2016 | Hu | ................... | C03C 23/007 |
| | | | | 428/220 |
| 2016/0122240 A1* | 5/2016 | Oram | ................... | C03C 21/002 |
| | | | | 428/220 |
| 2017/0022092 A1* | 1/2017 | DeMartino | ............ | C03C 3/091 |
| 2017/0158556 A1* | 6/2017 | Dejneka | ............ | C03C 3/097 |
| 2017/0297956 A1 | 10/2017 | Bookbinder et al. | | |
| 2017/0355640 A1* | 12/2017 | Oram | ................... | C03C 3/097 |
| 2018/0105461 A1* | 4/2018 | Schneider | ............ | C03C 21/005 |
| 2018/0304588 A1* | 10/2018 | Harris | ................... | B32B 17/06 |
| 2020/0308046 A1* | 10/2020 | Amin | ................... | H05K 5/0017 |
| 2021/0047237 A1* | 2/2021 | Schneider | ............ | C03C 21/002 |

FOREIGN PATENT DOCUMENTS

| | | |
|---|---|---|
| JP | 2015-511573 A | 4/2015 |
| JP | 2018-531870 A | 11/2018 |

* cited by examiner

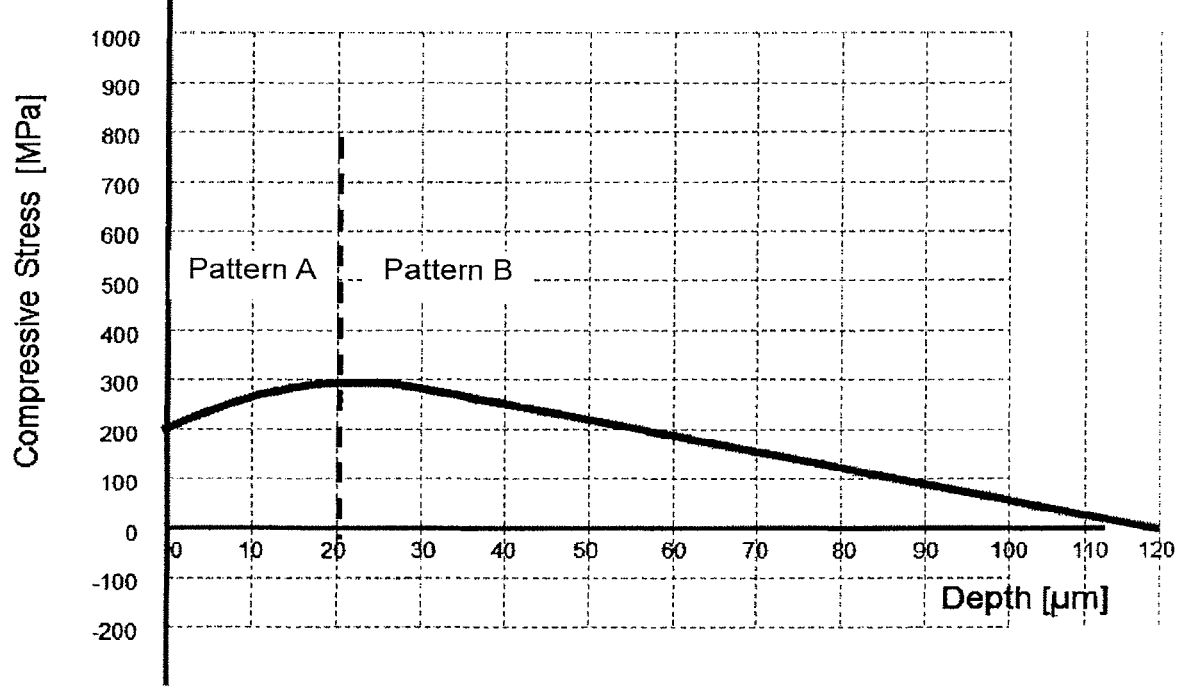
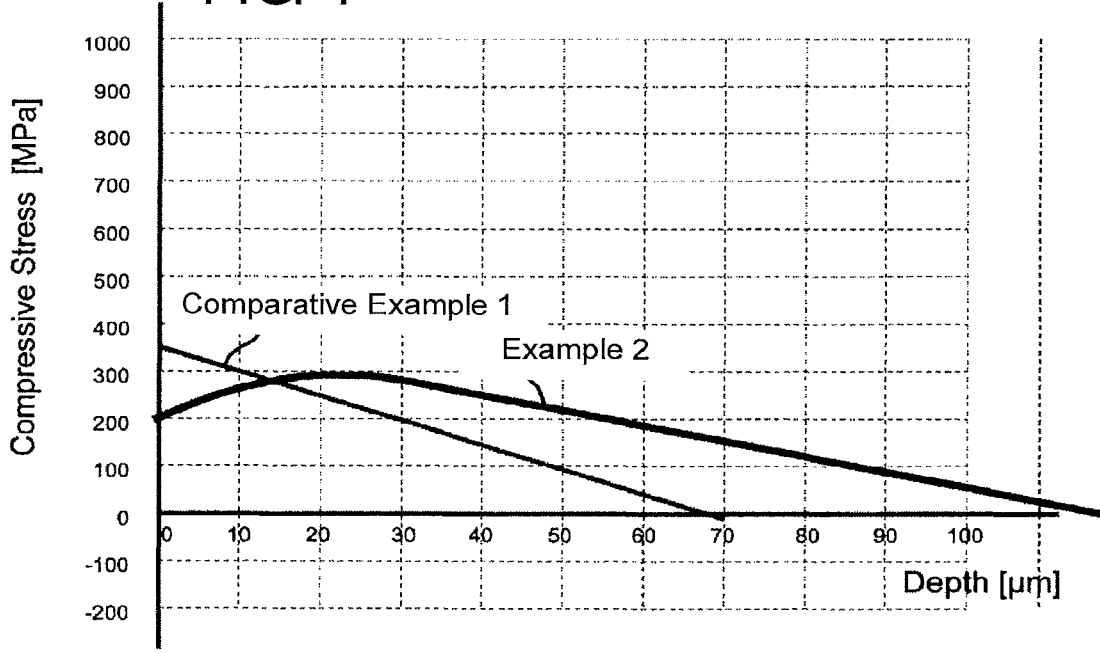

CHEMICALLY STRENGTHENED GLASS AND METHOD FOR PRODUCING THE SAME

TECHNICAL FIELD

The present invention relates to a chemically strengthened glass and a method for producing the same.

BACKGROUND ART

A cover glass is generally disposed on a front surface of a display unit in a mobile device such as a smartphone or a tablet. Recently, a cover glass is also disposed on an opposite surface to the display unit in order to provide a high quality feeling.

A glass for chemical strengthening is used as glass for the cover glass. A method for producing a chemically strengthened glass is a method in which a soda lime based glass, an aluminosilicate based glass, a lithium based glass or the like is used, and atoms having small ion radius are replaced with atoms having large ion radius.

As the aforementioned method, a method in which the glass is immersed in a chemical strengthening treatment tank heated to a high temperature is generally used. For example, the glass is immersed in a potassium nitrate solution to replace sodium ions in the glass with potassium ions in the potassium nitrate solution. Thus, a compressive stress layer is formed in a surface layer of the glass.

Surface compressive stress (hereinafter also referred to as CS) is compressive stress formed in a surface layer of glass. The CS is generated by ion exchange in which ions having larger volume enter the surface layer of the glass. The CS resists tensile stress (central tension, hereinafter also referred to as CT) inside the glass which leads to breakage of the glass. Thus, the chemically strengthened glass has higher strength than the glass which has not been chemically strengthened.

Depth of compressive stress layer (depth of layer, hereinafter also referred to as DOL) is a depth of a region where the compressive stress is formed, on the basis of the surface (outermost surface) of the glass. When the value of the depth of compressive stress layer is increased, it is possible to suppress cracking originating from a micro-crack occurring in the surface of the glass. Thus, scratch resistance of the glass can be improved, and the glass can be prevented from easily cracking.

In the chemically strengthened glass, when d μm represents a thickness of the glass, the relationship among the CT MPa, the CS MPa and the DOL μm is expressed by the following expression.

$$CT=(CS*DOL)/(d-2*DOL)$$

Patent Document 1 discloses a method for increasing the value of the DOL, in which the CS is reduced in a compressive stress layer deeper than the glass surface to increase the value of the DOL and thereby increase the CS in the glass surface.

PRIOR ART DOCUMENTS

Patent Document

Patent Document 1: US Patent Application Publication No. 2015/0239775

SUMMARY OF THE INVENTION

Problem that the Invention is to Solve

It has been known that when the value of the DOL of the chemically strengthened glass is increased to make the DOL deeper from the surface, the glass can be prevented from easily cracking and that when the CT is made too large, the number of crushed pieces may increase and affect a human body if the glass is cracked and therefore it is practically necessary to set not to provide the CT being a certain value or more. It has been also known that there is a limit to increase the value of the DOL because there is a limit in the CT. In the present description, the limit of the CT is referred to as "CT-limit". The CT-limit depends on the kind of glass and the thickness of the glass.

Patent Document 1 discloses a method in which CS is reduced to increase the value of DOL in a compressive stress layer deeper than a glass surface, to thereby increase CS in the glass surface. However, due to the small value of the CS in a position deeper than the glass surface, an effect against cracking of the glass is reduced.

Therefore, an object of the present invention is to provide a chemically strengthened glass in which a value of DOL is large, and a value of CS in a position deeper than a surface is large, in comparison with the background art.

Means for Solving the Problem

The present inventor found that when ion exchange is performed in two or more stages with a specified range of a ratio of alkali metal ions in a salt used for chemical strengthening, CS in a glass surface can be reduced and a value of DOL can be increased, so as to obtain a chemically strengthened glass in which the value of CS in a position deeper than the glass surface is larger than in the background art. Thus, the present invention was completed.

The present invention relates to the following <1> to <15>. <1> A chemically strengthened glass having a compressive stress layer formed in a glass surface layer by ion exchange, wherein the compressive stress layer includes at least two types of stress patterns of a stress pattern A close to a glass surface and a stress pattern B on an inner side of the glass, in the stress pattern A, compressive stress increases as going inward from the glass surface, in the stress pattern B, compressive stress decreases as going inward from the glass surface, depth of compressive stress layer in the stress pattern B is 90 μm or more from the glass surface, and compressive stress α MPa of the glass surface in the stress pattern A and compressive stress β MPa at a point where the stress pattern A and the stress pattern B cross each other satisfy a relation of β>α. <2> The chemically strengthened glass according to <1>, wherein a value obtained by dividing the compressive stress α MPa by the compressive stress β MPa is less than 0.9. <3> The chemically strengthened glass according to <1> or <2>, wherein the compressive stress layer includes the two types of stress patterns of the stress pattern A and the stress pattern B, and depth of compressive stress layer in the stress pattern A is more than 10 μm. <4> The chemically strengthened glass according to any one of <1> to <3>, wherein the compressive stress layer further includes a stress pattern C on an inner side of the glass from the stress pattern B, and when the stress pattern C is approximated as a linear function, an slope i MPa/μm of compressive stress thereof satisfies −8≤i<0. <5> The chemically strengthened glass according to any one of <1> to <4>, wherein a value of compressive stress of 250 MPa or more at a position 15 μm deep from the glass surface thereof is 250 MPa or more. <6> The chemically strengthened glass according to any one of <1> to <5>, which has a thickness of 0.7 mm or less. <7> A method for producing a chemically strengthened glass, in which a compressive stress layer is formed in a glass surface layer by an ion exchange treatment of replacing alkali metal ions a in a glass with alkali metal ions b having larger ion radius than the alkali metal ions a, the method including for the ion exchange treatment: a first step of bringing the glass into contact with a first salt which contains the alkali metal ions a and the alkali metal ions b and in which a ratio of a molar amount of the alkali metal ions b to a total of a molar amount of the alkali metal ions a and the molar amount of the alkali metal ions b is X1%; and a second step of bringing the glass into contact with a second salt in which the ratio is X2% being smaller than X1% after the first step. <8> The method for producing a chemically strengthened glass according to <7>, wherein the ratio X1 is 85-100%. <9> The method for producing a chemically strengthened glass according to <7> or <8>, wherein the ratio X2 is 50-95%. <10> The method for producing a chemically strengthened glass according to any one of <7> to <9>, wherein a value obtained by dividing the ratio X1% by the ratio X2% is more than 1.05. <11> A method for producing a chemically strengthened glass, in which a compressive stress layer is formed in a glass surface layer by an ion exchange treatment of replacing alkali metal ions a in the glass with alkali metal ions b having larger ion radius than the alkali metal ions a, the method comprising sequentially for the ion exchange treatment: a first step of bringing the glass into contact with a first salt which contains the alkali metal ions a and the alkali metal ions b and in which a ratio of a molar amount of the alkali metal ions b to a total of a molar amount of the alkali metal ions a and the molar amount of the alkali metal ions b is X1' %; a second step of bringing the glass into contact with a second salt in which the ratio is X2' %; and a third step of bringing the glass into contact with a third salt in which the ratio is X3' %; wherein the ratios X1' %, X2' % and X3' % satisfy a relation of X3'<X2' and a relation of X1'<X2'. <12> The method for producing a chemically strengthened glass according to <11>, wherein the ratio X1' is 50-95%. <13> The method for producing a chemically strengthened glass according to <11> or <12>, wherein the ratio X2' is 95-100%. <14> The method for producing a chemically strengthened glass according to any one of <11> to <13>, wherein the ratio X3' is 50-95%. <15> The method for producing a chemically strengthened glass according to any one of <11> to <14>, wherein each of a value obtained by dividing the ratio X2' by the ratio X1' and a value obtained by dividing the ratio X2' by the ratio X3' is 1.1 or more.

Advantage of the Invention

A chemically strengthened glass according to the present invention is a chemically strengthened glass in which CS in a glass surface is reduced to increase a value of depth of compressive stress layer, and a value of CS in a position deeper than the glass surface is large, so that the chemically strengthened glass is excellent in scratch resistance and can be prevented from easily cracking.

BRIEF DESCRIPTION OF DRAWINGS

FIG. 3 is a view showing a stress profile of a chemically strengthened glass (Example 2) according to the present invention.

FIG. 4 is a view showing the stress profile of the chemically strengthened glass (Example 2) according to the present invention, and a stress profile of Comparative Example 1 (extracted from FIG. 10a of the specification of US Patent Publication No. 2015/0239775) obtained by a two-stage chemical strengthening treatment.

DETAILED DESCRIPTION OF THE INVENTION

Mode for Carrying Out the Invention

The present invention will be described in detail below. The invention is not limited to the following embodiment, but may be desirably deformed and carried out without departing from the gist of the invention. In the present description, a symbol "–" used for indicating a numerical range means that the numerical values that precede and succeed the symbol are included in the range as the lower limit and the upper limit.

<Chemically Strengthened Glass>

A chemically strengthened glass according to the present invention is a chemically strengthened glass having a compressive stress layer formed in a glass surface layer by ion exchange, wherein the compressive stress layer includes at least two types of stress patterns of a stress pattern A close to a glass surface and a stress pattern B on an inner side of the glass, in the stress pattern A, compressive stress increases as going inward from the glass surface, in the stress pattern B, compressive stress decreases as going inward from the glass surface, depth of compressive stress layer in the stress pattern B is 90 μm or more from the glass surface, and compressive stress α MPa of the glass surface in the stress pattern A and compressive stress β MPa at a point where the stress pattern A and the stress pattern B cross each other satisfy a relation of β>α.

Figure 1:
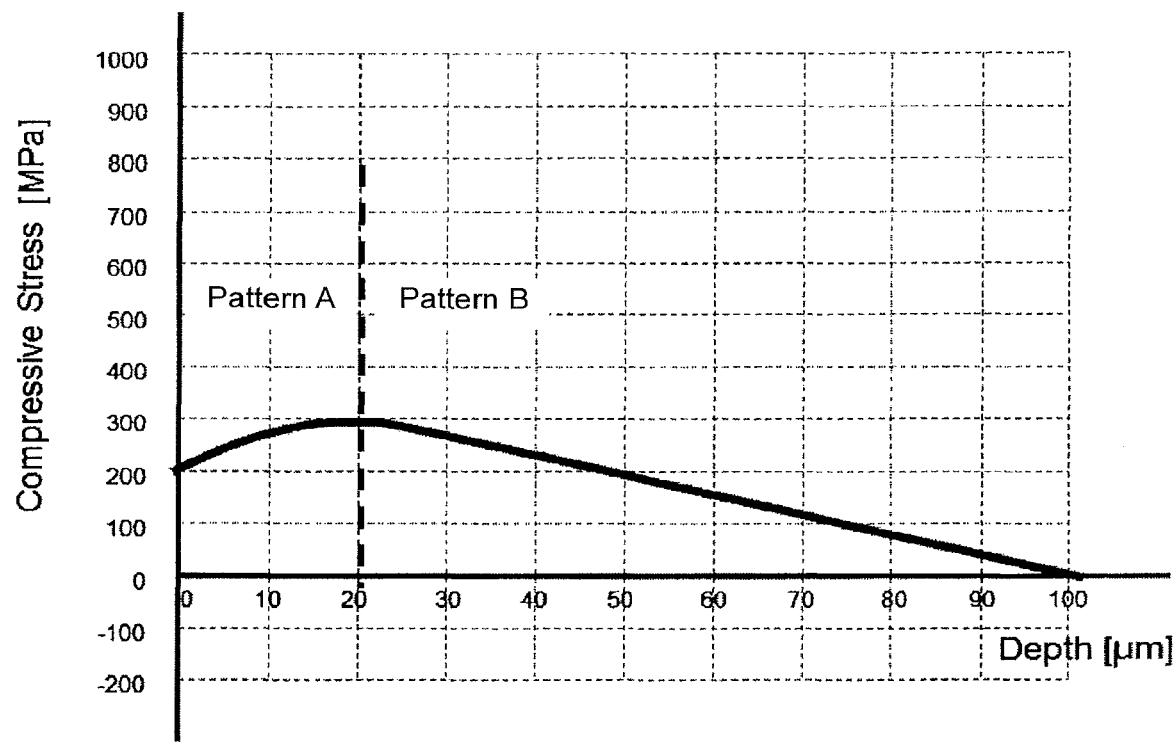
FIG. 1 is a view showing a stress profile of a chemically strengthened glass (Example 1) according to the present invention.
Figure 2:
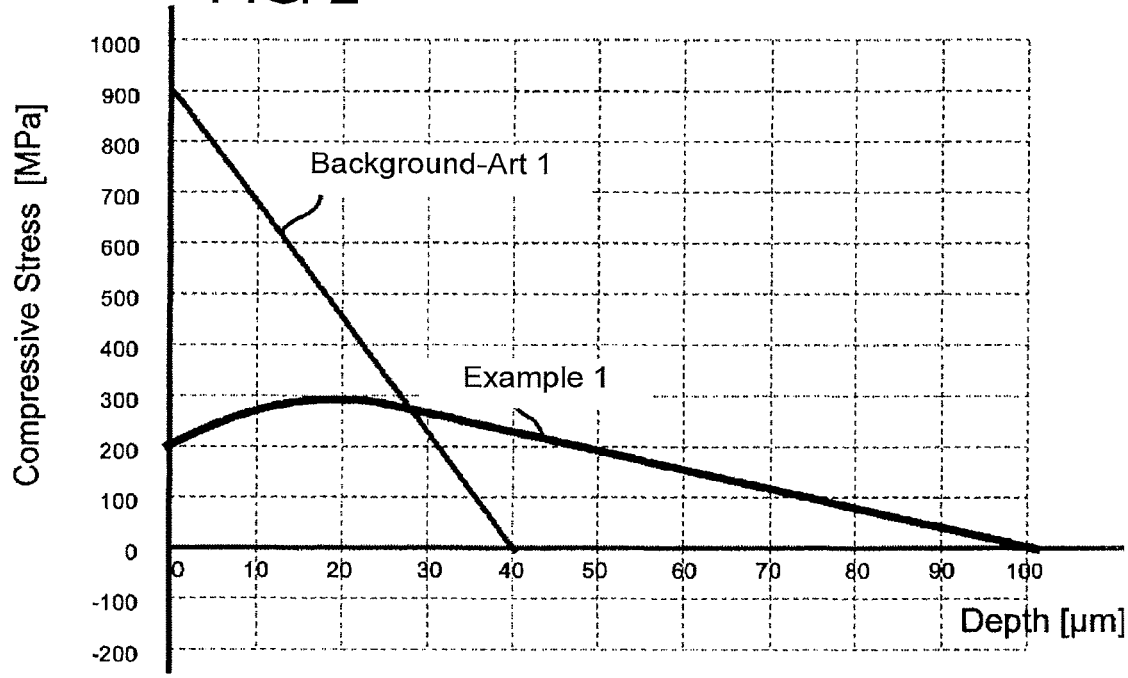
FIG. 2 is a view showing the stress profile of the chemically strengthened glass (Example 1) according to the present invention, and a stress profile of a background-art product (Background-Art 1) obtained by a one-stage chemical strengthening treatment.

FIG. 1 is a view showing a stress profile of a chemically strengthened glass (Example 1) according to the present invention. FIG. 2 is a view showing the stress profile of the chemically strengthened glass (Example 1) according to the present invention, and a stress profile of a background-art product (Background-Art 1) obtained by a one-stage chemical strengthening treatment. FIG. 3 is a view showing a stress profile of a chemically strengthened glass (Example 2) according to the present invention. FIG. 4 is a view showing the stress profile of the chemically strengthened glass (Example 2) according to the present invention, and a stress profile of Comparative Example 1 (extracted from FIG. 10a of the specification of US Patent Publication No. 2015/0239775) obtained by a two-stage chemical strengthening treatment.

As shown in FIG. 1 to FIG. 4, the chemically strengthened glass according to the present invention includes at least two types of stress patterns in the compressive stress layer. The two types of stress patterns are the stress pattern A and the stress pattern B satisfying the aforementioned relation. Here, as described above, in the chemically strengthened glass, when the thickness of the glass is d μm, the relationship among tension stress CT (Central-Tension) MPa generated inside the glass, CS MPa and DOL μm can be expressed by the following expression.

$$CT=(CS*DOL)/(d-2*DOL)$$

In the chemically strengthened glass according to the present invention, the compressive stress α MPa of the glass surface in the stress pattern A and the compressive stress β MPa at the point where the stress pattern A and the stress pattern B cross each other satisfy the relation of β>α. When the CS in the glass surface is reduced, the value of the DOL can be increased.

In addition, as shown in FIG. 1 to FIG. 4, the chemically strengthened glass according to the present invention has the at least two types of stress patterns in the compressive stress layer. Accordingly, the compressive stress in a vicinity of a depth of 40 μm from the glass surface is higher than in a background-art product obtained by a chemical strengthening treatment performed in one stage or two stages. Thus, the chemically strengthened glass according to the present invention is excellent in scratch resistance against a protrusion which is as large as about 40 μm.

In the chemically strengthened glass according to the present invention, a value (α/β) obtained by dividing the compressive stress α MPa of the glass surface in the stress pattern A by the compressive stress β MPa at the point where the stress pattern A and the stress pattern B cross each other is preferably less than 0.9, more preferably 0.8 or less, and further more preferably 0.75 or less. When the value is less than 0.9, the compressive stress layer can be inserted to a deeper site. The lower limit of the value is not limited particularly, but it is preferably 0.1 or more and more preferably 0.2 or more because the magnitude of the compressive stress in the glass surface has an effect against cracking due to bending.

In order to make the value obtained by dividing the compressive stress α by the compressive stress β less than 0.9, specifically for example, a method for carrying out a chemical strengthening treatment in two or more stages using a molten salt while changing concentration thereof is preferably used in a production method (1) or (2) which will be described later. Although a method using thermal diffusion or the like may be used, it is desired to carry out a chemical strengthening treatment in multiple stages using a molten salt while changing concentration thereof, from the viewpoint of controllability.

When the two types of stress patterns of the stress pattern A and the stress pattern B are provided in the compressive stress layer in the chemically strengthened glass according to the present invention, the depth of compressive stress layer in the stress pattern A is preferably more than 5 μm from the surface, and more preferably more than 10 μm therefrom. When the depth is 10 μm or more, it is possible to expect an effect of preventing propagation of a crack deeply intruded from the glass surface. The upper limit of the depth is not limited particularly. When the depth increases, the value β has to be reduced so that the propagation of the crack cannot be prevented easily. Therefore, the depth is preferably 60 μm or less, and more preferably 40 μm or less.

In order to make the depth of compressive stress layer in the stress pattern A 10 μm or more from the glass surface, specifically for example, it goes well when treatment temperature is increased or treatment time is prolonged in the second stage of the chemical strengthening treatment, in the production method (1) which will be described later.

Figure 5:
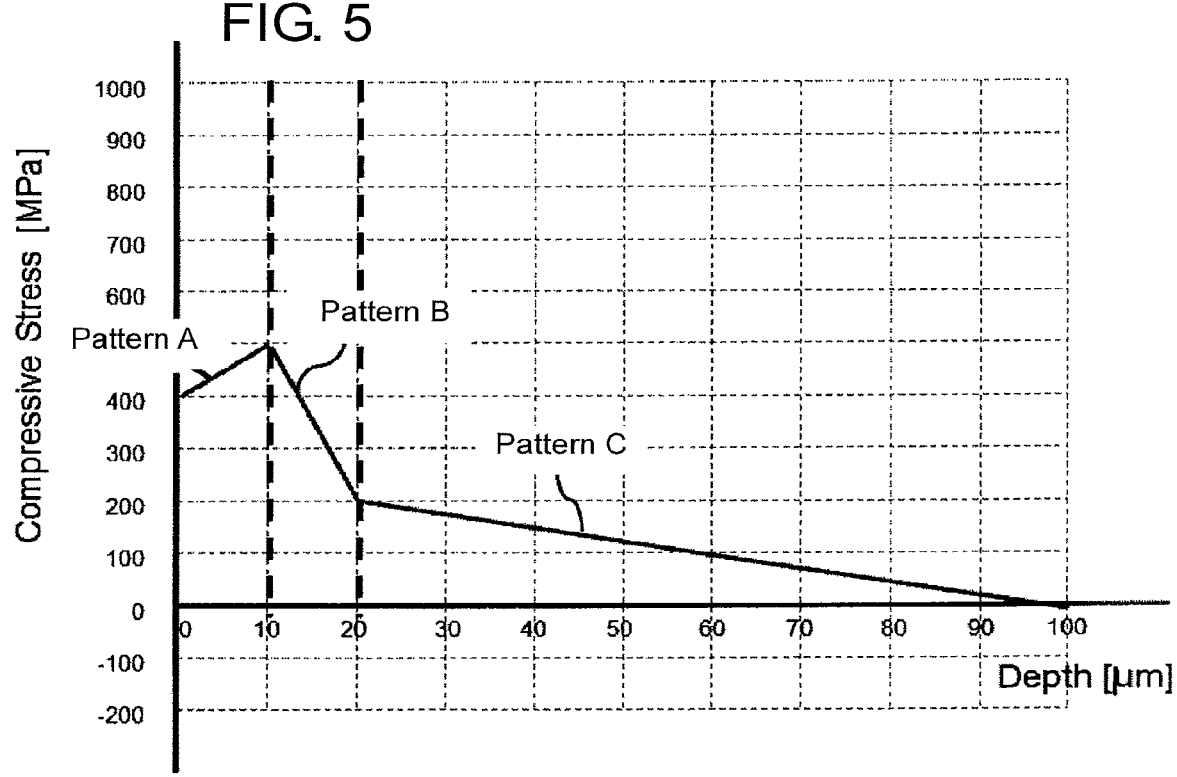
FIG. 5 is a view showing a stress profile of a chemically strengthened glass (Example 3) according to the present invention.

The chemically strengthened glass according to the present invention may further include a stress pattern C on an inner side of the glass from the stress pattern B in the compressive stress layer, in addition to the stress pattern A and the stress pattern B. When the stress pattern C is approximated as a linear function, a slope i MPa/μm thereof is −8 or more and less than 0. FIG. 5 shows stress pattern of a chemically strengthened glass (Example 3) according to the present invention including the stress patterns A to C.

When the stress pattern C is approximated as a linear function, the slope i MPa/μm thereof is preferably −8 or more, and more preferably −5 or more. When the slope i MPa/μm is −8 or more, the depth of compressive stress layer can be inserted to a deeper site. Thus, the glass can be prevented from easily cracking.

The slope i MPa/μm is preferably less than 0, and more preferably −2 or less. When the slope i MPa/μm is less than 0, the compressive stress layer can be formed.

In order to make the slope i MPa/μm −8 or more and less than 0, specifically for example, it is preferable to reduce the concentration of the molten salt for ion exchange, to increase the temperature thereof, and to prolong the time thereof, in the production method (2) which will be described later.

When the stress pattern C is provided in the compressive stress layer in the chemically strengthened glass according to the present invention, the depth of compressive stress layer in the stress pattern A is preferably 5 μm or more from the glass surface, and more preferably 10 μm or more therefrom, in order to expect an effect of preventing propagation of a crack deeply intruded from the glass surface. When the depth is large, the value β has to be reduced so that the propagation of the crack cannot be prevented easily. Therefore, the depth is preferably 60 μm or less, and more preferably 40 μm or less.

When the stress pattern C is provided in the compressive stress layer in the chemically strengthened glass according to the present invention, the depth of compressive stress layer in the stress pattern C is preferably 90 μm or more from the glass surface, more preferably 100 μm or more therefrom, and further more preferably 110 μm or more therefrom. When the depth is too large, the magnitude of the compressive stress may be reduced. Therefore, the depth is preferably 200 μm or less, and more preferably 180 μm or less.

In the chemically strengthened glass according to the present invention, the value of the CS at a position 15 μm deep from the glass surface is preferably 150 MPa or more, more preferably 200 MPa or more, and further more preferably 250 MPa or more. On the other hand, the upper limit of the value of the CS is not limited particularly, but it is preferably 600 MPa or less, and more preferably 400 MPa or less.

In order to make the value of the CS at the position 15 μm deep from the glass surface 250 MPa or more, specifically for example, it is preferable to increase the concentration of the molten salt for ion exchange in the second stage of the chemical strengthening treatment.

The values of the CS and the DOL are measured by a surface stress meter.

In terms of desired reduction in weight and thickness as a cover glass, the thickness of the chemically strengthened glass according to the present invention is preferably 1.1 mm or less, more preferably 0.9 mm or less, and further more preferably 0.7 mm or less. The lower limit of the thickness is not limited particularly, but it is typically preferably 0.2 mm or more, and more preferably 0.3 mm or more.

The chemically strengthened glass according to the present invention is produced by an ion exchange treatment in which alkali metal ions a in the glass are replaced in the glass surface with alkali metal ions b having larger ion radius than the alkali metal ions a.

For example, when the alkali metal ions a are sodium ions ($Na^+$ ions), at least one of potassium ions ($K^+$ ions), rubidium ions ($Rb^+$ ions) and cesium ions ($Cs^+$ ions) can be used as the alkali metal ions b. When the alkali metal ions a are sodium ions ($Na^+$ ions), it is preferable to use potassium ions as the alkali metal ions b.

One kind or two or more kinds of nitrate, sulfate, carbonate, hydroxide salt and phosphate each containing at least the metal ions b can be used for the ion exchange treatment. When the alkali metal ions a are sodium ions, it is preferable to use nitrate containing at least potassium ions.

The glass before the ion exchange is not limited particularly. An aluminosilicate glass, a soda lime glass, a lithium glass, and a borosilicate glass can be used as long as they contain alkali metal ions which can be ion-exchanged. The aluminosilicate glass is preferred, and it is more preferable that the glass contains, substantially as represented by mole percentage based on oxides, 50-80% of $SiO_2$, 1-30% of $Al_2O_3$, 0-6% of $B_2O_3$, 0-6% of $P_2O_5$, 0-20% of $Li_2O$, 0-20% of $Na_2O$, 0-10% of $K_2O$, 0-20% of MgO, 0-20% of CaO, 0-20% of SrO, 0-15% of BaO, 0-10% of ZnO, 0-5% of $Ti_2O$, and 0-8% of $ZrO_2$.

A preferred embodiment of the content of each component is described below as represented by mole % based on oxides.

$SiO_2$ is an essential component which constitutes the glass. This component also reduces the occurrence of cracking when the glass surface is scratched (indented), or reduces the ratio of the destruction as might occur when the glass is indented after being chemically strengthened. $SiO_2$ also enhances the acid resistance of the glass, and is a component (with hydrofluoric acid resistance) which reduces the amount of sludge during an etching treatment.

When the content of $SiO_2$ is too large, the viscosity becomes too high, and productivity including solubility or formability tends to deteriorate. Therefore, the content of $SiO_2$ is more preferably 54% or more, 58% or more, 60% or more, 63% or more, 66% or more, or 68% or more in order of stepwise increase in preference. On the other hand, when the content of $SiO_2$ exceeds 80%, the viscosity of the glass increases to extremely lower the meltability. The content of $SiO_2$ is preferably 80% or less, more preferably 78% or less, further more preferably 76% or less, particularly preferably 74% or less, and most preferably 72% or less.

When $Al_2O_3$ increases, the CS during the chemical strengthening treatment can be enhanced, while the depth of compressive stress layer is lowered. Therefore, the content of $Al_2O_3$ is more preferably 3% or more, 5% or more, 7% or more, 8% or more, 9% or more, 10% or more, 11% or more, 12 or more, or 13% or more in order of stepwise increase in preference. On the other hand, when the content of $Al_2O_3$ exceeds 30%, the glass deteriorates in acid resistance and devitrification resistance, and also deteriorates in meltability. The content of $Al_2O_3$ is preferably 30% or less, more preferably 25% or less, further more preferably 20% or less, particularly preferably 18% or less, and most preferably 15% or less.

$B_2O_3$ is a component for improving the chipping resistance and improving the meltability of the glass. $B_2O_3$ does not have to be contained. When $B_2O_3$ is contained, the content thereof is preferably 0.5% or more, more preferably 1% or more, and further more preferably 2% or more. On the other hand, when the content of $B_2O_3$ exceeds 6%, striae may occur due to volatilization during melting, causing a fear of a defect. The content of $B_2O_3$ is preferably 6% or less, more preferably 5% or less, further more preferably 4% or less, and particularly preferably 3% or less.

$P_2O_5$ is a component for improving the performance of ion exchange and the chipping resistance. $P_2O_5$ does not have to be contained. When $P_2O_5$ is contained, the content thereof is preferably 0.5% or more, more preferably 1% or more, and further more preferably 2% or more. On the other hand, when the content of $P_2O_5$ exceeds 6%, the glass deteriorates in crushability extremely, and also deteriorates in acid resistance extremely. The content of $P_2O_5$ is preferably 6% or less, more preferably 5% or less, further more preferably 4% or less, and particularly preferably 3% or less.

$Li_2O$ is a component for forming surface compressive stress by ion exchange.

For a chemical strengthening treatment in which Li ions in the glass surface are replaced with Na ions is performed, the content of $Li_2O$ is preferably 3% or more, more preferably 4% or more, further more preferably 5% or more, particularly preferably 6% or more, and typically 7% or more. On the other hand, when the content of $Li_2O$ exceeds 20%, the glass deteriorates in acid resistance extremely. The content of $Li_2O$ is preferably 20% or less, more preferably 18% or less, further more preferably 16% or less, particularly preferably 15% or less, and most preferably 13% or less.

For a chemical strengthening treatment in which Na ions in the glass surface are replaced with K ions is performed, when the content of $Li_2O$ exceeds 3%, the magnitude of the compressive stress is lowered. In this case, the content of $Li_2O$ is preferably 3% or less, more preferably 2% or less, further more preferably 1% or less, particularly preferably 0.5% or less, and most preferably $Li_2O$ is substantially not contained.

The phrase "substantially not contained" in the present description means the component is not contained other than inevitable impurities contained in a raw material or the like, that is, not intentionally contained. Specifically, the phrase means that the content in the glass composition is less than 0.1 mol %.

$Na_2O$ is a component for forming the compressive stress layer by ion exchange, and improving the meltability of the glass. For a chemical strengthening treatment in which Li ions in the glass surface are replaced with Na ions is performed, $Na_2O$ does not have to be contained. However, when the meltability of the glass is emphasized, $Na_2O$ may be contained. When $Na_2O$ is contained, the content thereof is preferably 1% or more. The content of $Na_2O$ is more preferably 2% or more, and further more preferably 3% or more. On the other hand, when the content of $Na_2O$ exceeds 8%, the surface compressive stress formed by ion exchange is extremely lowered. The content of $Na_2O$ is preferably 8% or less, more preferably 7% or less, further more preferably 6% or less, particularly preferably 5% or less, and most preferably 4% or less.

For a chemical strengthening treatment in which Na ions in the glass surface are replaced with K ions is performed, $Na_2O$ is essential and the content thereof is 5% or more. The content of $Na_2O$ is preferably 5% or more, more preferably 7% or more, further more preferably 9% or more, particularly preferably 11% or more, and most preferably 12% or more. On the other hand, when the content of $Na_2O$ exceeds 20%, the glass deteriorates in acid resistance extremely. The content of $Na_2O$ is preferably 20% or less, more preferably 18% or less, further more preferably 16% or less, particularly preferably 15% or less, and most preferably 14% or less.

When the glass is immersed in a mixed molten salt of potassium nitrate and sodium nitrate to replace Li and Na in the glass with Na and K concurrently, the content of $Na_2O$ is preferably 10% or less, more preferably 9% or less, further more preferably 8% or less, particularly preferably 7% or less, most preferably 6% or less, and especially preferably 5% or less, and the content of $Na_2O$ is preferably 2% or more, more preferably 3% or more, and further more preferably 4% or more.

$K_2O$ is a component which increases the ion exchange rate to thereby make the compressive stress layer deeper, has an effect of decreasing the melting temperature of the glass, and increases nonbridging oxygen. In addition, $K_2O$ can avoid increase in change of the surface compressive stress caused by $NaNO_3$ concentration in a molten salt of potassium nitrate used for the chemical strengthening treatment. Further, a small amount of $K_2O$ has an effect of suppressing the intrusion amount of tin from a bottom surface during formation using a float method. Therefore, when formation is performed using the float method, it is preferably to contain $K_2O$. In order to obtain the aforementioned effects, the content of $K_2O$ in the glass according to the present invention is preferably 0.5% or more, more preferably 1% or more, further more preferably 2% or more, and particularly preferably 3% or more. On the other hand, when $K_2O$ is too much, the CS deteriorates. Therefore, the content of $K_2O$ is more preferably 8% or less, further more preferably 6% or less, particularly preferably 4% or less, and most preferably 2% or less.

MgO is a component which can stabilize the glass, improve the meltability, and reduce the content of alkali metal to suppress increase in coefficient of thermal expansion (CTE) when the component is added. In order to obtain the aforementioned effects, the content of MgO in the glass according to the present invention is preferably 2% or more, more preferably 3% or more, 4% or more, 5% or more, 6% or more, 7% or more, or 8% or more in order of stepwise increase in preference. On the other hand, when the content of MgO exceeds 20%, the glass tends to devitrify, causing a defect. The content of MgO is preferably 20% or less, more preferably 18% or less, 15% or less, 14% or less, 13% or less, 12% or less, 11% or less, or 10% or less in order of stepwise increase in preference.

CaO and SrO are components which improve crushability of the glass, and also components which improve meltability of the glass. These components may be contained. When these components are contained, each content thereof is preferably 0.5% or more, more preferably 1% or more, further more preferably 2% or more, particularly preferably 3% or more, and most preferably 5% or more. On the other hand, when each content of the components exceeds 20%, the performance of ion exchange deteriorates extremely. Each content of CaO and SrO is preferably 20% or less, more preferably 18% or less, further more preferably 16% or less, particularly preferably 14% or less, and most preferably 12% or less. The content of CaO is especially preferably 10% or less, 8% or less, 6% or less, 5% or less, 3% or less, or 1% or less in order of stepwise increase in preference.

BaO is a component which improves crushability of the glass, and also a component which improves meltability of the glass. The component may be contained.

When BaO is contained, the content thereof is preferably 0.5% or more, more preferably 1% or more, further more preferably 2% or more, particularly preferably 3% or more, and most preferably 5% or more. On the other hand, when the content of BaO exceeds 15%, the performance of ion exchange deteriorates extremely. The content of BaO is preferably 15% or less, more preferably 13% or less, further more preferably 11% or less, particularly preferably 9% or less, and most preferably 7% or less.

ZnO is a component which improves meltability of the glass. The component may be contained. When ZnO is contained, the content thereof is preferably 0.25% or more, and more preferably 0.5% or more. On the other hand, when the content of ZnO exceeds 10%, weatherability of the glass deteriorates extremely. The content of ZnO is preferably 10% or less, more preferably 7% or less, 5% or less, 4% or less, 3% or less, 2% or less, or 1% or less in order of stepwise increase in preference.

$TiO_2$ is a component which improves crushability of the glass. The component may be contained. When $TiO_2$ is contained, the content thereof is preferably 0.1% or more, more preferably 0.15% or more, and further more preferably 0.2% or more. On the other hand, when the content of $TiO_2$ exceeds 5%, the glass tends to devitrify, causing a defect. The content of $TiO_2$ is preferably 5% or less, more preferably 3% or less, 2% or less, further more preferably 1% or less, particularly preferably 0.5% or less, and most preferably 0.25% or less.

$ZrO_2$ is a component which improves crushability of the glass, and also a component which increases the surface compressive stress by ion exchange. The component may be contained. When $ZrO_2$ is contained, the content thereof is preferably 0.5% or more, and more preferably 1% or more. On the other hand, when the content of $ZrO_2$ exceeds 8%, the glass tends to devitrify, causing a defect. The content of $ZrO_2$ is preferably 8% or less, more preferably 6% or less, further more preferably 4% or less, particularly preferably 2% or less, and most preferably 1.5% or less.

$Y_2O_3$, $La_2O_3$, and $Nb_2O_5$ are components which improve crushability of the glass. These components may be contained. When the components are contained, each content of the components is preferably 0.5% or more, more preferably 1% or more, further more preferably 1.5% or more, particularly preferably 2% or more, and most preferably 2.5% or more. On the other hand, when each content of $Y_2O_3$, $La_2O_3$, and $Nb_2O_5$ exceeds 8%, the glass tends to devitrify, causing a defect. Each content of $Y_2O_3$, $La_2O_3$, and $Nb_2O_5$ is preferably 8% or less, more preferably 6% or less, further more preferably 5% or less, particularly preferably 4% or less, and most preferably 3% or less.

The composition of the glass is measured by a X-ray fluorescence method.

Examples of the other components may include $CeO_2$, $Fe_2O_3$, V (vanadium), Mn (manganese), Co (cobalt), Cu (copper), Mo (molybdenum), etc.

The composition of the glass before ion exchange is not limited particularly. For example, glass having the following glass compositions may be used. (1) Glass containing, as represented by mole percentage based on oxides, 60-70% of $SiO_2$, 5-15% of $Al_2O_3$, 10-16% of $Na_2O$, 0-5% of $K_2O$, and 0-10% of MgO. (2) Glass containing, as represented by mole percentage based on oxides, 65-75% of $SiO_2$, 0-5% of $Al_2O_3$, 8-15% of $Na_2O$, 0-3% of $K_2O$, 0-7% of MgO, and 5-10% of CaO. (3) Glass containing, as represented by mole percentage based on oxides, 60-70% of $SiO_2$, 10-20% of $Al_2O_3$, 10-20% of $Na_2O$, 0-3% of $K_2O$, 0-3% of MgO, and 1-10% of $B_2O_3$. (4) Glass containing, as represented by mole percentage based on oxides, 50-65% of $SiO_2$, 5-15% of $Al_2O_3$, 10-20% of $Na_2O$, 0-5% of $K_2O$, 0-5% of MgO, and 0-5% of $P_2O_5$. (5) Glass containing, as represented by mole percentage based on oxides, 50-70% of $SiO_2$, 5-15% of $Al_2O_3$, 3-10% of $Li_2O$, 0-10% of $Na_2O$, 0-2% of $K_2O$, and 0-10% of MgO.

The glass before ion exchange is molded by a general glass molding method such as a float method, a rollout method, or a downdraw method. Among these, it is preferable that the glass is molded by the float method. Typically the chemically strengthened glass according to the present invention has a plate-like shape. However, the chemically strengthened glass may be a flat plate, or a glass plate subjected to bending.

The chemically strengthened glass according to the present invention has a size capable of being molded by an existing molding method. Finally, the glass is cut into a size suitable to an intended purpose. That is, the glass is cut into a size as large as a display of a tablet PC, a smartphone or the like, a glass for an automobile, a window glass of a building or a housing, etc. The chemically strengthened glass according to the present invention is typically cut into a rectangular shape. However, the glass may be cut into another shape such as a circular shape or a polygonal shape, and may be a perforated glass.

<Method for Producing Chemically Strengthened Glass>

The following process conditions are exemplary in order to obtain a desired strengthened profile. The conditions depend on the components of the glass.

[Production Method (1): Method for Producing Chemically Strengthened Glass Including Two Types of Stress Patterns in Compressive Stress Layer]

A method for producing a chemically strengthened glass according to an embodiment of the present invention is a method for producing a chemically strengthened glass, in which a compressive stress layer is formed in a glass surface layer by an ion exchange treatment of replacing alkali metal ions a in a glass with alkali metal ions b having larger ion radius than the alkali metal ions a. The method includes for the ion exchange treatment a first step of bringing the glass into contact with a first salt which contains the alkali metal ions a and the alkali metal ions b and in which a ratio of a molar amount of the alkali metal ions b to a total of a molar amount of the alkali metal ions a and the molar amount of the alkali metal ions b is X1%, and a second step of bringing the glass into contact with a second salt in which the ratio is X2% being smaller than X1% after the first step.

In the first step, the glass is brought into contact with the first salt in which the ratio is X1% to perform ion exchange in the glass surface layer (first chemical strengthening treatment). After that, in the second step, the glass is brought into contact with the second salt in which the ratio is X2% being smaller than X1% to perform ion exchange (second chemical strengthening treatment). Thus, the CS in the glass surface is reduced to insert the compressive stress layer more deeply, so that the value of the CS at a deep position from the glass surface can be increased. In this manner, the chemical strengthening is performed in the two stages of treatment. Thus, two types of stress patterns A and B can be formed in the compressive stress layer.

In the present description, "bringing a glass into contact with a salt" means that the glass is brought into contact with or immersed into a salt bath. In this manner, "contact" is regarded as a concept including "immersion" in the present description.

The salt may be brought into contact in a form in which the salt made into a paste is brought into direct contact with the glass, a form in which the salt is sprayed to the glass as an aqueous solution, a form in which the glass is immersed into the molten salt heated to its melting point, etc. Among these, it is preferable to immerse the glass into the molten salt.

Specific examples of the alkali metal ions a and the alkali metal ions b have been described above. In addition, as for the kind of salt, for example, a mixture of at least one or more kinds of nitrate, sulfate, carbonate, hydroxide salt and phosphate may be used.

Each of the ratio X1 and the ratio X2 represent a ratio [%] of the molar amount of the alkali metal ions b to the total of the molar amount of the alkali metal ions a and the molar amount of the alkali metal ions b.

The ratio X1 is preferably 85% or more, more preferably 90% or more, and further more preferably 96% or more. When the ratio X1 of the first salt is 85% or more, the CS can be increased. The first salt substantially does not have to contain the alkali metal ions a (for example, sodium ions), and may contain only the alkali metal ions b (for example, potassium ions) as cations.

The ratio X2 is preferably 95% or less, more preferably 85% or less, and further more preferably 75% or less. The ratio X2 is preferably 50% or more, more preferably 60% or more, and further more preferably 65% or more. When the ratio X2 of the second salt is 95% or less, the compressive stress in the glass surface can be reduced, and a deeper depth of compressive stress layer can be obtained. In addition, the ratio X2 of the second salt has to be 50% or more, in order to prevent excessive reduction of the compressive stress in the glass surface.

A value obtained by dividing the ratio X1% by the ratio X2% is preferably more than 1.05, and more preferably 1.10 or more. When the ratio X1 and the ratio X2 satisfy the aforementioned relation, the compressive stress can be inserted deeply, and the CS in the glass surface can be also increased.

Although description has been made on the assumption that the configurations of the first salt and the second salt are limited to the alkali metal ions a and the alkali metal ions b, stable metal oxides, impurities or other salts causing no reaction with the salts may be present as long as they do not impair the object of the present invention. For example, Ag ions or Cu ions may be contained.

The depth of compressive stress layer of the stress pattern B formed after the first step is 90 μm or more from the glass surface. The depth of compressive stress layer is preferably 100 μm or more, and more preferably 110 μm or more. On the other hand, when the depth of compressive stress layer is too deep, the magnitude of the compressive stress is reduced. Thus, the depth of compressive stress layer is preferably 200 μm or less, and more preferably 180 μm or less. In the first step, it is preferable that the treatment temperature (temperature of the first salt) and the treatment time are adjusted in accordance with the ratio X1 of the first salt to set the depth of compressive stress layer within the aforementioned range.

The treatment temperature (temperature of the first salt) in the first step is preferably 400° C. or more, and more preferably 430° C. or more. In addition, the treatment temperature is preferably 500° C. or less, more preferably 470° C. or less, and further more preferably 450° C. or less. When the temperature of the first salt is 400° C. or more, the rate of ion exchange can be increased to shorten the chemically strengthening time. On the other hand, when the temperature of the first salt is 500° C. or less, the volatilization of the salt can be reduced.

In the second step, it is preferable that the treatment temperature (temperature of the second salt) is adjusted so that the depth of compressive stress layer of the stress pattern A formed after the second step can be preferably made more than 10 μm.

The temperature of the second salt is preferably 380° C. or more, and more preferably 400° C. or more. In addition, the temperature is preferably 500° C. or less, more preferably 470° C. or less, and further more preferably 450° C. or less. When the temperature of the second salt is 380° C. or more, ion exchange can be performed. On the other hand, when the temperature is 500° C. or less, the volatilization of the salt can be reduced. The depth of compressive stress layer formed in the second step is so small that the time for which the glass is brought into contact with the salt is shortened. Accordingly, the depth of compressive stress layer tends to be affected by a time variation. It is therefore preferable that the temperature in the second step is made lower than that in the first step in order to reduce the influence of the time variation.

It is preferable that the first salt which contains the alkali metal ions a and the alkali metal ions b and in which the ratio $X1$ of the molar amount of the alkali metal ions b to the total of the molar amount of the alkali metal ions a and the molar amount of the alkali metal ions b is preferably 85-100% is used in the first step, and a compressive stress layer preferably 90-180 μm deep from the surface layer is formed in the glass surface after the first step. In addition, it is preferable that the second salt in which the ratio $X2$ is preferably 50-95% is used in the second step, and the stress pattern A is formed in the glass surface so that the depth of compressive stress layer thereof formed after the second step is preferably more than 10 μm.

A total of the time for which the glass is brought into contact with the first salt in the first step and the time for which the glass is brought into contact with the second salt in the second step is preferably 1 hour or more. The total time is preferably 240 hours or less, and more preferably 100 hours or less.

Specifically, the time for which the glass is brought into contact with the first salt in the first step is preferably 48 hours or less, and more preferably 24 hours or less. In addition, the time is preferably 1 hour or more, and more preferably 3 hours or more. When the time for which the glass is brought into contact with the first salt is 48 hours or less, the production efficiency can be enhanced. In addition, when the time for which the glass is brought into contact with the first salt is 1 hour or more, the influence of the time variation can be reduced.

The time for which the glass is brought into contact with the second salt in the second step is preferably 24 hours or less, more preferably 12 hours or less, and further more preferably 6 hours or less. In addition, the time is preferably 0.5 hours or more, and more preferably 1 hour or more. When the time for which the glass is brought into contact with the second salt is 24 hours or less, the production efficiency can be enhanced. In addition, when the time for which the glass is brought into contact with the second salt is 0.5 hours or more, the influence of the time variation can be reduced.

[Production Method (2): Method for Producing Chemically Strengthened Glass Including Three Types of Stress Patterns in Compressive Stress Layer]

A method for producing a chemically strengthened glass according to another embodiment of the present invention is a method for producing a chemically strengthened glass, in which a compressive stress layer is formed in a glass surface layer by an ion exchange treatment of replacing alkali metal ions a in the glass with alkali metal ions b having larger ion radius than the alkali metal ions a. The method includes sequentially for the ion exchange treatment a first step of bringing the glass into contact with a first salt which contains the alkali metal ions a and the alkali metal ions b and in which a ratio of a molar amount of the alkali metal ions b to a total of a molar amount of the alkali metal ions a and the molar amount of the alkali metal ions b is $X1'$ %, a second step of bringing the glass into contact with a second salt in which the ratio is $X2'$ %, and a third step of bringing the glass into contact with a third salt in which the ratio is $X3'$ %. The ratios $X1'$ %, $X2'$ % and $X3'$ % satisfy a relation of $X3'<X2'$ and a relation of $X1'<X2'$.

In the first step, the glass is brought into contact with the first salt in which the ratio is $X1'$ % to perform ion exchange (first chemical strengthening treatment). After that, in the second step, the glass is brought into contact with the second salt in which the ratio is $X2'$ % being larger than $X1'$ % to perform ion exchange (second chemical strengthening treatment). After that, in the third step, the glass is brought into contact with the third salt in which the ratio is $X3'$ % being smaller than $X2'$ % to perform ion exchange (third chemical strengthening treatment). Thus, the CS in the glass surface is reduced to increase the depth of compressive stress layer, so that the value of the CS at a deep position from the glass surface can be increased. In addition, the chemical strengthening is performed in the three stages of treatment. Thus, three types of stress patterns A to C can be formed in the compressive stress layer.

Specific examples of the alkali metal ions a and the alkali metal ions b, and kinds of the salts have been described above.

Each of the ratio $X1'$, the ratio $X2'$ and the ratio $X3'$ represents a ratio [%] of the molar amount of the alkali metal ions b to the total of the molar amount of the alkali metal ions a and the molar amount of the alkali metal ions b.

The ratio $X1'$ is preferably 95% or less, more preferably 90% or less, and further preferably 85% or less. The ratio $X1'$ is preferably 50% or more, more preferably 60% or more, and further more preferably 70% or more. When the ratio $X1'$ of the first salt is 95% or less, the compressive stress can be reduced, and the depth of compressive stress layer can be increased to be deeper. On the other hand, when the ratio $X1'$ of the first salt is 50% or more, the compressive stress can be increased, and the depth of compressive stress layer can be increased to be deeper. The first salt substantially does not have to contain the alkali metal ions a (for example, sodium ions), and may contain only the alkali metal ions b (for example, potassium ions) as cations.

The ratio $X2'$ is preferably 100% or less. In addition, the ratio $X2'$ is preferably 95% or more. When the ratio $X2'$ of the second salt is 100% or less and 95% or more, the compressive stress can be increased. The second salt substantially does not have to contain the alkali metal ions a (for example, sodium ions), and may contain only the alkali metal ions b (for example, potassium ions) as cations.

The ratio $X3'$ is preferably 95% or less, more preferably 90% or less, and further preferably 85% or less. In addition, the ratio $X3'$ is preferably 50% or more, more preferably 60% or more, and further more preferably 70% or more. When the ratio $X3'$ of the third salt is 95% or less, the compressive stress can be reduced. On the other hand, when the ratio $X3'$ of the third salt is 50% or more, the compressive stress in the glass surface can be increased.

It is preferable that the ratios $X1'$ %, $X2'$ % and $X3'$ % satisfy the relation of $X3'<X2'$ and the relation of $X1'<X2'$. When the $X1'$, $X2'$ and $X3'$ satisfy the aforementioned relations, the depth of compressive stress layer can be increased to be deeper, and the compressive stress can be increased in a site close to the glass surface. In addition, it is preferable that each of a value obtained by dividing the ratio X2' by the ratio X1' and a value obtained by dividing the ratio X2' by the ratio X3' is 1.1 or more.

Although description has been made on the assumption that the configurations of the first salt, the second salt and the third salt are limited to the alkali metal ions a and the alkali metal ions b, stable metal oxides, impurities or other salts causing no reaction with the salts may be present as long as they do not impair the object of the present invention. For example, Ag ions or Cu ions may be contained.

The depth of compressive stress layer formed after the first step is 90 μm or more. The depth of compressive stress layer is preferably 100 μm or more, and more preferably 110 μm or more. In addition, the depth of compressive stress layer is preferably 200 μm or less, and more preferably 180 μm or less. In the first step, it is preferable that the treatment temperature (temperature of the first salt) and the treatment time are adjusted in accordance with the ratio X1' of the first salt to set the depth of compressive stress layer within the aforementioned range.

The treatment temperature (temperature of the first salt) in the first step is preferably 400° C. or more, and more preferably 430° C. or more. In addition, the treatment temperature is preferably 500° C. or less, more preferably 470° C. or less, and further more preferably 450° C. or less. When the temperature of the first salt is 400° C. or more, the rate of ion exchange can be increased to shorten the chemically strengthening time. On the other hand, when the temperature of the first salt is 500° C. or less, the volatilization of the salt can be reduced.

In the second step, it is preferable that the treatment temperature (temperature of the second salt) is adjusted so that the depth of compressive stress layer of the stress pattern B formed after the second step can be preferably made more than 10 μm.

The temperature of the second salt is preferably 380° C. or more, and more preferably 400° C. or more. In addition, the temperature is preferably 500° C. or less, and more preferably 470° C. or less. When the temperature of the second salt is 380° C. or more, ion exchange can be performed. On the other hand, when the temperature is 500° C. or less, the volatilization of the salt can be reduced.

In the third step, it is preferable that the treatment temperature (temperature of the third salt) is adjusted so that the depth of compressive stress layer of the stress pattern A formed after the third step can be preferably made more than 5 μm.

The temperature of the third salt is preferably 380° C. or more. In addition, the temperature is preferably 500° C. or less, more preferably 470° C. or less, and further more preferably 450° C. or less. When the temperature of the third salt is 380° C. or more, ion exchange can be performed. On the other hand, when the temperature is made 500° C. or less, the volatilization of the salt can be reduced.

It is preferable that the first salt in which the ratio X1' is preferably 50-95% is used in the first step, and a compressive stress layer preferably 90-180 μm deep is formed in the glass surface after the first step. In addition, it is preferable that the second salt in which the ratio X2' is preferably 95-100% is used in the second step, and the stress pattern B is formed in the glass surface so that the depth of compressive stress layer thereof formed after the second step is preferably 10 μm or more. Further, it is preferable that the third salt in which the ratio X3' is preferably 50-95% is used in the third step, and the stress pattern A is formed in the glass surface so that the depth of compressive stress layer thereof formed after the third step is preferably more than 5 μm.

A total of the time for which the glass is brought into contact with the first salt in the first step, the time for which the glass is brought into contact with the second salt in the second step, and the time for which the glass is brought into contact with the third salt in the third step is preferably 3 hours or more, and preferably 48 hours or less.

The time for which the glass is brought into contact with the first salt in the first step is preferably 240 hours or less, and more preferably 100 hours or less. In addition, the time is preferably 1 hour or more. When the time for which the glass is brought into contact with the first salt is 240 hours or less, the production efficiency can be enhanced. In addition, when the time for which the glass is brought into contact with the first salt is 1 hour or more, the influence of the time variation can be reduced.

The time for which the glass is brought into contact with the second salt in the second step is preferably 24 hours or less, and preferably 0.5 hours or more. When the time for which the glass is brought into contact with the second salt is 24 hours or less, the production efficiency can be enhanced. In addition, when the time for which the glass is brought into contact with the second salt is 0.5 hours or more, the influence of the time variation can be reduced.

The time for which the glass is brought into contact with the third salt in the third step is preferably 24 hours or less, and preferably 0.5 hours or more. When the time for which the glass is brought into contact with the second salt is 24 hours or less, the production efficiency can be enhanced. In addition, when the time for which the glass is brought into contact with the second salt is 0.5 hours or more, the influence of the time variation can be reduced.

EXAMPLES

The present invention will be described specifically along the following examples. However, the invention is not limited to the examples.

Example 1

(1) Production of Chemically Strengthened Glass

As a glass before ion exchange (chemically strengthening), a glass plate measuring 160 mm×80 mm×0.7 mm was prepared using a glass having the following composition (represented by mol % based on oxides) produced by a float method. Glass Composition: 64% of $SiO_2$, 10% of $Al_2O_3$, 16% of $Na_2O$, 1% of $K_2O$, and 8% of MgO (2) Chemically Strengthening Step As a first step, the prepared glass plate was immersed for 24 hours in a mixed molten salt (first salt, ratio X1: 90%) bath containing 90 mol % of potassium nitrate and 10 mol % of sodium nitrate and held at 450° C. After that, the glass plate was extracted from a bath tank, and the surface of the glass plate was washed and dried.

Next, as a second step, the dried glass plate was immersed for 1 hour in a mixed molten salt (second salt, ratio X2: 85%) bath containing 85 mol % of potassium nitrate and 15 mol % of sodium nitrate and held at 430° C. After that, the glass plate was extracted from a bath tank, and the surface of the glass plate was washed and dried. Through the aforementioned steps, a chemically strengthened glass of Example 1 was produced.

Example 2

A chemically strengthened glass of Example 2 was produced in the same manner as in Example 1, except that the thickness of the glass plate was set at 0.8 mm and the glass plate was immersed for 30 hours in the first step.

Example 3

The same glass plate as that in Example 1 was used as a glass plate before ion exchange (chemically strengthening). As a first step, the prepared glass plate was immersed for 24 hours in a mixed molten salt (first salt, ratio X1': 85%) bath containing 85 mol % of potassium nitrate and 15 mol % of sodium nitrate and held at 450° C. After that, the glass plate was extracted from a bath tank, and the surface of the glass plate was washed and dried.

Next, as a second step, the dried glass plate was immersed for 1 hour in a mixed molten salt (second salt, ratio X2': 100%) bath containing 100 mol % of potassium nitrate and held at 430° C. After that, the glass plate was extracted from a bath tank, and the surface of the glass plate was washed and dried.

Next, as a third step, the dried glass plate was immersed for 1 hour in a mixed molten salt (third salt, ratio X3': 75%) bath containing 75 mol % of potassium nitrate and 25 mol % of sodium nitrate and held at 380° C. After that, the glass plate was extracted from a bath tank, and the surface of the glass plate was washed and dried. Through the aforementioned steps, a chemically strengthened glass of Example 3 was produced.

Stress profiles of the chemically strengthened glasses of Examples 1 to 3 are shown in FIG. 1, FIG. 3 and FIG. 5 respectively. FIG. 2 shows the stress profile of the chemically strengthened glass (Example 1) according to the present invention and the stress profile of a background-art product (Background-Art 1) obtained by a one-stage chemical strengthening treatment. FIG. 4 shows the stress profile of the chemically strengthened glass (Example 2) according to the present invention and the stress profile of Comparative Example 1 (extracted from FIG. 10a in US Patent Publication No. 2015/0239775) obtained by a two-stage chemical strengthening treatment.

As shown in FIG. 1, FIG. 3 and FIG. 5, each of the chemically strengthened glasses of Examples 1 to 3 had at least two types of stress patterns in a compressive stress layer. The stress patterns included a stress pattern A close to the glass surface, and a stress pattern B on the inner side of the glass. In the stress pattern A, compressive stress increased as going inward from the glass surface. In the stress pattern B, compressive stress decreased as going inward from the glass surface. Compressive stress $\alpha$ MPa of the glass surface in the stress pattern A and compressive stress $\beta$ MPa at a point where the stress pattern A and the stress pattern B crossed each other satisfied a relation of $\beta>\alpha$. In each of Examples 1 to 3, a value obtained by dividing the compressive stress $\alpha$ MPa by the compressive stress $\beta$ MPa was less than 0.9.

In addition, as shown in FIG. 1 to FIG. 5, in each of the chemically strengthened glasses of Examples 1 to 3, the value of CS at a 15 m deep from the glass surface was 250 MPa or more, and the value of CS at a position 40 μm deep from the glass surface was 100 MPa or more. It was found that each of Examples 1 to 3 showed a stress profile larger in depth of compressive stress layer value and larger in CS value at a deep position from the glass surface than in the background art.

As shown in FIG. 5, the chemically strengthened glass of Example 3 further included a stress pattern C on the inner side of the glass from the stress pattern B, in addition to the stress pattern A and the stress pattern B. When the stress pattern C was approximated as a linear function, a slope $i$ MPa/μm thereof was −8 or more and less than 0.

While the present invention has been described in detail and with reference to specific embodiments thereof, it will be apparent to one skilled in the art that various changes and modifications can be made therein without departing from the spirit and scope thereof.

This application is based on Japanese Patent Application No. 2017-026227 filed on Feb. 15, 2017, the entire subject matter of which is incorporated herein by reference.

The invention claimed is:

1. A chemically strengthened glass having a compressive stress layer formed in a glass surface layer by ion exchange, wherein
    the compressive stress layer includes at least two types of stress patterns of a stress pattern A close to a glass surface and a stress pattern B on an inner side of the glass,
    in the stress pattern A, compressive stress increases as going inward from the glass surface,
    in the stress pattern B, compressive stress decreases as going inward from the glass surface,
    depth of compressive stress layer in the stress pattern B is 90 μm or more from the glass surface, and
    compressive stress $\alpha$ MPa of the glass surface in the stress pattern A and compressive stress $\beta$ MPa at a point where the stress pattern A and the stress pattern B cross each other satisfy a relation of $\beta>\alpha$, and wherein the compressive stress layer further includes a stress pattern C on an inner side of the glass from the stress pattern B, and when the stress pattern C is approximated as a linear function, a slope i MPa/μm of compressive stress thereof satisfies $-8 \le i < 0$.

2. The chemically strengthened glass according to claim 1, wherein a value obtained by dividing the compressive stress $\alpha$ MPa by the compressive stress $\beta$ MPa is less than 0.9.

3. The chemically strengthened glass according to claim 1, wherein the compressive stress layer includes the two types of stress patterns of the stress pattern A and the stress pattern B, and depth of compressive stress layer in the stress pattern A is more than 10 μm.

4. The chemically strengthened glass according to claim 1, wherein a value of compressive stress of 250 MPa or more at a position 15 μm deep from the glass surface thereof is 250 MPa or more.

5. A chemically strengthened glass according to claim 1, which has a thickness of 0.7 mm or less.

6. A method for producing a chemically strengthened glass according to claim 1, in which a compressive stress layer is formed in a glass surface layer by an ion exchange treatment of replacing alkali metal ions a in the glass with alkali metal ions b having larger ion radius than the alkali metal ions a, the method comprising sequentially for the ion exchange treatment:
    a first step of bringing the glass into contact with a first salt which contains the alkali metal ions a and the alkali metal ions b and in which a ratio of a molar amount of the alkali metal ions b to a total of a molar amount of the alkali metal ions a and the molar amount of the alkali metal ions b is X1'%;
    a second step of bringing the glass into contact with a second salt in which the ratio is X2'%; and
    a third step of bringing the glass into contact with a third salt in which the ratio is X3'%; wherein:
    the ratios X1'%, X2'% and X3'% satisfy a relation of X3'<X2' and a relation of X1'<X2'.

7. The method for producing a chemically strengthened glass according to claim 6, wherein the ratio X1' is 50-95%.

8. The method for producing a chemically strengthened glass according to claim 6, wherein the ratio X2' is 95-100%.

9. The method for producing a chemically strengthened glass according to claim 6, wherein the ratio X3' is 50-95%.

10. The method for producing a chemically strengthened glass according to claim 6, wherein each of a value obtained by dividing the ratio X2' by the ratio X1' and a value obtained by dividing the ratio X2' by the ratio X3' is 1.1 or more.

* * * * *